Jan. 7, 1936.  W. G. DUNN  2,026,828
WIND DRIVEN GENERATOR STRUCTURE
Filed April 15, 1935
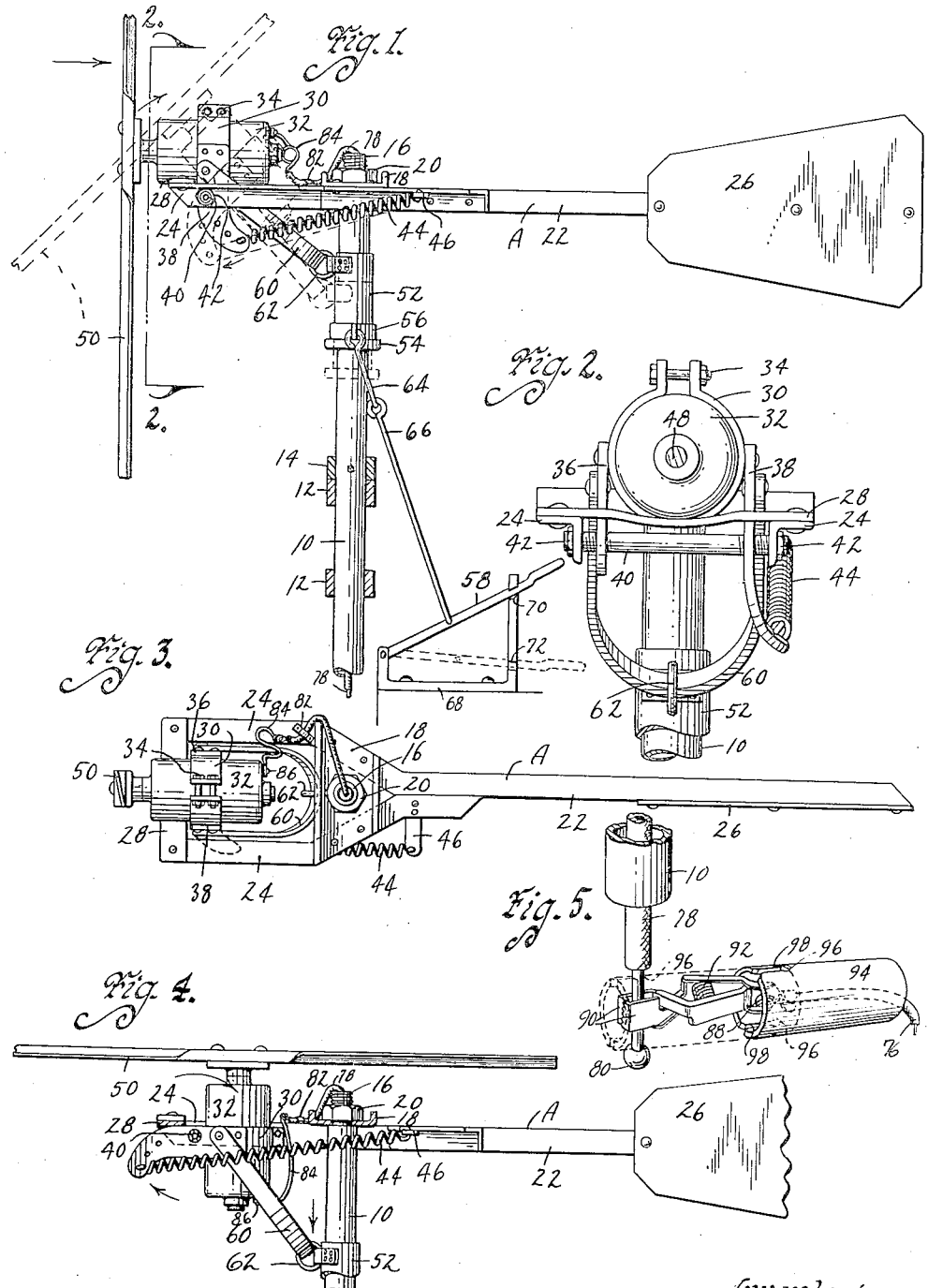
Inventor
William G. Dunn
By Bair, Freeman & Sinclair
Attorneys
Witness
Edw. Seeley Patented Jan. 7, 1936

2,026,828

UNITED STATES PATENT OFFICE 2,026,828

WIND DRIVEN GENERATOR STRUCTURE

William G. Dunn, Clarinda, Iowa

Application April 15, 1935, Serial No. 16,371

13 Claims. (Cl. 290—55)

An object of my invention is to provide a wind driven generator structure of simple, durable and inexpensive construction.

A further object of my invention is to provide a self-governing wind driven generator to prevent the generator and propeller from attaining destructive speeds in high winds.

Still a further object is to provide means to manually tip the propeller out of the wind to thereby render it inoperative if desired.

A further object is to pivot the generator on an axis at right angles to the pivotal axis of the structure, which latter axis is provided for maintaining the propeller facing the wind by the use of a vane in the ordinary manner, the generator being automatically tipped to a position out of the wind in proportion to the force of the wind without its gyroscopic action affecting its setting as determined by the vane.

With these and other objects in view my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a wind driven generator structure embodying my invention.

Figure 2 is an enlarged sectional view on the line 2—2 of Figure 1 showing a front view of the generator and its mounting.

Figure 3 is a plan view of Figure 1.

Figure 4 is a side elevation showing the generator tipped to an inoperative position; and Figure 5 is an enlarged perspective view of an electrical connecting device of swivel type for my generator apparatus.

On the accompanying drawing I have used the reference numeral 10 to indicate a vertical shaft or pipe serving as a support for my generator structure.

The pipe 10 is suitably pivoted in bearings 12, the bearings being supported on a tower (not shown) or other support in the usual manner, a collar 14 being used to prevent longitudinal movement of the pipe 10 relative to the bearings 12. On the upper end of the pipe a shouldered and threaded extension 16 is projected through a piece of channel iron 18, which is retained rigidly in connection therewith by a nut 20.

The channel bar 18 is connected with and supports a Y-shaped frame A comprising a leg 22 and arms 24. A directional vane 26 is secured to the leg 22 of the frame A. A cross bar 28, which serves as a stop as will hereinafter appear, is secured to the arms 24. A generator clamping means 30 is provided for supporting a generator 32. A bolt 34 serves to clamp the band 30 around the generator 32. The band 30 is supported by arms 36 and 38, which in turn are secured, as by screw threading, to a rod 40. The ends of the rod 40 are pivoted at the forward ends of the arms 24 and retained in position by nuts or the like 42. The arm 38 is connected by a spring 44 with an ear 46 projecting from the frame A. The parts are so shaped and arranged that the spring 44 tends to maintain the generator 32 against the cross bar 28, which thereby acts as a stop (see Figures 2 and 3).

The generator can be tipped to another position, such as shown in Figure 4, whereupon the arm 38 engages the underside of the cross bar 28 for stopping pivotal movement of the generator about the axis 40 at its other limit of movement.

On the shaft 48 of the generator 32 I mount a propeller 50. I provide means for manually tipping the propeller from the position of Figure 1 to the position of Figure 4 against the action of the spring 44, consisting of a sleeve 52 having a flange 54, a collar 56, a hand lever and a link 60. The link 60 is U-shaped and has its arms pivoted to the arms 36 and 38 and its central portion extending through a loop 62. The loop 62 is secured to the sleeve 52. The collar 56 engages above the flange 54 and is connected by a yoke 64 and a link 66 with the lever 58. The lever 58 is pivoted to any suitable stationary support 68 and can be locked in either a lowered or a raised position, for instance, by engaging in either of the notches 70 or 72 of the support 68.

As a convenient and simple means for electrically connecting the generator 32 with a conductor 76, shown in Figure 5, which leads to a storage battery or other device using the electric current, I have provided a relatively heavy insulated wire 78 having its lower end headed as at 80 and its upper end clamped to the Y-frame 24 by a clip 82. This wire is then connected by a flexible lead 84 with the insulated terminal 86 of the generator 32.

The generator 32 has its other terminal grounded so that the other circuit wire may be connected with the tube 10 or one of the bearings 12 to complete the circuit.

A clamp 86 of the type ordinarily called a "battery clip" is connected with the conductor 76 as at 88. This clip has a pair of jaws 90, which are constrained to resiliently engage the wire 78 above the head 80 by a spring 92.

For protecting the clip 86 against undesired contact with any object, and thus short circuiting of the current, I provide a protector tube 94 of sufficient length to cover it and extend past the wire 78. This tube may be made of rubber or the like, and is provided with a pair of openings 96, with which slots 98 communicate, the slots opening at the end of the tube. The full line position of the tube in Figure 5 permits manipulation of the clip 86 to place it on the wire 78, whereafter the tube is shifted to the dotted position, the wire 78 passing through the slots 98 and finally seating in the openings 96. Since the slots are narrower than the diameter of the wire, the tube will remain in this position until manually disengaged. The head 80 prevents the tube and the clip from dropping off the lower end of the wire 78.

By this construction, a simple and inexpensive swivel connection is provided between the generator which rotates in accordance with wind direction and relative to the stationary conductor 76.

*Practical operation*

In ordinary types of windmills, the directional vanes are arranged so that they can be swung at an angle to the plane of the wind wheel for swinging the wheel out of position with respect to the direction of the wind. When a propeller is provided for a generator, however, the speed must be quite high and I have experienced a decided gyroscopic action with the propeller rotating at the proper speed. Therefore in attempting to use the ordinary type of control, I have experienced difficulty because instead of the propeller being swung out of the wind, it remains in its original position, due to the gyroscopic action, even though the vane is attempting, by the wind pressure on it, to swing the propeller to another position. By arranging the axis 40 at right angles to the axis 10, however, I find that I can tip the propeller from the position of Figure 1 to the position of Figure 4 without affecting the position of Figure 4, assuming the propeller is inoperative and will soon stop rotating. Since the vertical axis 10 is fixed by the bearings 12, this axis cannot be shifted by the gyroscopic action of the propeller and accordingly, although the gyroscopic action tends to resist tipping from the position of Figure 1 to the position of Figure 4, it can be so tipped without excessive manual exertion on the lever 58.

I have also experienced in the use of propellers for wind driven generators an undesirable high speed of the propeller when the wind is high. If the propeller is not nicely balanced, this results in excessive vibration of the structure which is, of course, destructive. With wind speeds of twenty miles per hour, the propeller speed is not excessively fast, and I therefore arrange the tension of the spring 44 (it being associable with the arm 38 at different distances from the axis 40) so that at wind speeds of over twenty miles per hour, the wind pressure exerted on the propeller will tip it back against the action of the spring. Such a position is shown by dotted lines in Figure 1. The greater the wind pressure, the greater the degree of tipping and consequently the wind is less effective to rotate the propeller, resulting in a speed which is no longer in proportion to the speed of the wind but remains at approximately the speed which it would attain in a twenty mile per hour wind.

Thus the structure is self-governing in order to prevent excessive speeds in high winds.

By the axis 40 being at right angles to the axis 10 this self-governing feature does not tend to swing the vane 26 to an undesired position, due to the gyroscopic action. By arranging the collar 56 above the flange 54 the sleeve 52 can slide downwardly as to the dotted line position of Figure 1 without affecting the handle 58.

Whenever it is desired to render the propeller ineffective, as in Figure 4, however, the collar 56 can pull downwardly on the flange 54 for tipping the generator to its inoperative position.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a wind driven generator structure, a frame mounted on a vertical pivot, a vane for maintaining said frame in a desired position relative to the direction of the wind, a generator pivoted on a horizontal axis on said frame, an arm on said generator, a propeller on the shaft of said generator and having its axis of rotation vertically spaced from said horizontal axis, a stop for said generator in position with its shaft horizontal and a spring having one end connected with said frame and its other end connected with said arm and thereby tending to maintain said generator in such position, said arm, when said generator is in such position, lying adjacent a line between said horizontal axis and said connection of said spring to said frame whereby to initially exert proportionally less leverage on said arm than when said generator is tipped on said horizontal axis from the initial position.

2. In a wind driven generator structure, a Y-shaped horizontally arranged frame pivoted on a vertical axis, a vane for maintaining said frame in position with the arms thereof pointing in a windward direction, a rotatable propeller carried by said arms, a generator driven thereby, means for pivoting said propeller on said arms on an axis at right angles to the pivotal axis of said frame, with the center of pressure of the propeller in non-intersecting relation to the pivotal axis of said propeller to said frame and with said generator in position to swing into the space between said arms when it is tipped from position with said propeller in a vertical position and means tending to maintain said propeller in a vertical position.

3. In a wind driven generator structure, a frame pivoted on a vertical axis, a vane for maintaining said frame in a predetermined position relative to the direction of the wind, a cradle pivotally supported by said frame on an axis at right angles to the pivotal axis of said frame, a generator mounted in said cradle and carried thereby, a propeller for driving said generator, the center of pressure of said propeller being vertically spaced from the pivotal axis of said cradle to said frame, a stop for said cradle in the vertical position of said propeller, an arm projecting from said cradle and a spring having one end connected therewith and its other end connected to said frame, said spring tending to maintain said propeller in its vertical position, said propeller being movable by the pressure of the wind away from said stop against the action of said spring, said arm being adjacent aligned position with said spring when said cradle is against said stop and approaching a position at right angles to aligned position as said propeller is tipped from its vertical position.

4. In a wind driven generator, a frame pivoted on a vertical axis, a vane secured to it for maintaining the frame in a predetermined position relative to the direction of the wind, a horizontal pivot pin carried by said frame, propeller shaft journalling means mounted on said pivot pin, a propeller shaft journalled therein and vertically spaced from said pin, a propeller mounted on said propeller shaft, a generator driven by said propeller shaft, said generator, propeller and propeller shaft tending normally to rotate about said pivot pin to an initial position and after being moved from said position by the wind pressure on said propeller, tending to rotate in an opposite direction about said pivot pin, and means, exerting increased tension as said propeller is moved from said initial position, for tending to urge said propeller to said initial position.

5. In a wind driven generator, a Y-shaped frame pivoted on a vertical axis, a vane secured to the leg of the frame for maintaining the frame in a predetermined position relative to the direction of the wind, a horizontal pivot pin carried by the arms of said frame, propeller shaft journalling means mounted on said pivot pin, a propeller shaft journalled therein and vertically spaced from said pin, a propeller mounted on said propeller shaft, means tending to maintain said journalling means in position with said propeller in a vertical plane, a generator driven by said propeller shaft, a sleeve vertically slidable about the vertical pivot axis for said frame, means for manually sliding said sleeve and an operative connection between said sleeve and said journalling means.

6. In a wind driven generator, a Y-shaped frame pivoted on a vertical axis, a vane secured to the leg of the frame for maintaining the frame in a predetermined position relative to the direction of the wind, a horizontal pivot pin carried by the arms of said frame, propeller shaft journalling means mounted on said pivot pin, a propeller shaft journalled therein and vertically spaced from said pin, a propeller mounted on said propeller shaft, means tending to maintain said journalling means in position with said propeller in a vertical plane, a generator driven by said shaft, a sleeve vertically slidable about the vertical pivot axis for said frame, a flange on said sleeve, a collar surrounding said sleeve and positioned on one side of said flange, means for manually moving said collar and thereby sliding said sleeve in one direction, said sleeve being slidable in such direction away from said collar due to the action of the wind swinging said journalling means about its pivotal axis.

7. In a wind driven generator, a frame pivoted on a vertical axis, a vane for maintaining said frame in a predetermined position relative to the direction of the wind, a generator carried by said frame, means for pivoting said generator on said frame on the axis at right angles to the pivoted axis of said frame, a propeller connected with said generator and having its center of pressure vertically spaced from the pivotal axis thereof and means constraining said propeller to a vertical position, the constraining action of said means increasing as said propeller is tipped about said pivotal axis from said vertical position by increase of wind pressure and the increase of constraining action being proportionally greater than the increase in the degree of tipping.

8. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, a member slidable longitudinally of said vertical axis, means for manually sliding said member and an operative connection between said member and said journalling means.

9. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, a member slidable longitudinally of said vertical axis, means for manually sliding said member and an operative connection between said member and said journalling means, said operative connection comprising a U-shaped link between the arms of which said generator swings when tipped from normal position.

10. In a wind driven generator structure, a frame pivoted on a vertical axis, a vane for maintaining said frame in a predetermined position, relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, a member slidable longitudinally of said vertical axis, means for manually sliding said member, an operative connection between said member and said journalling means, a projection on said member, a control member positioned on one side of said projection, means for manually moving said control member and thereby sliding said first member in one direction, said first member being slidable in such direction away from said control means due to the action of the wind swinging said journalling means about its pivotal axis.

11. In a device of the class described, a Y-shaped frame, a vane on the leg thereof for directing the arms thereof in a windward direction, clamping means pivoted on the arms of said frame and having an opening on one side of the pivotal axis, a generator clamped by said clamping means in said opening and thereby supported by the clamping means, a propeller for actuating said generator and for swinging it about said pivot upon an increase in wind pressure and means constraining said clamping means to a position with said propeller vertical, the wind pressure swinging the propeller from vertical toward horizontal position against the constraint of said means.

12. In a wind driven generator structure, a Y-shaped frame supported for pivoting about a vertical axis, a generator supported by the arms of said frame and pivoted on a horizontal axis, propeller journaling means carried by said generator, a propeller carried by said journaling means, said generator being so positioned with respect to said horizontal axis that its center of gravity is definitely positioned to one side thereof when said journaling means is in a vertical position.

13. In a wind driven generator structure, a Y-shaped frame supported for pivoting about a vertical axis, a generator supported by the arms of said frame for pivoting about a horizontal pivot, propeller journaling means having an axis at right angles to the said horizontal pivot and carried by said generator, a propeller normally positioned in a vertical plane and carried by said journaling means in an operative position, said generator being so positioned that when the propeller is moved to an inoperative position said journaling means lies between said vertical axis and said horizontal pivot and substantially aligned with said vertical axis.

WILLIAM G. DUNN.